US006809296B1

(12) United States Patent  
Cress

(10) Patent No.: US 6,809,296 B1  
(45) Date of Patent: Oct. 26, 2004

(54) ELECTRICAL ENERGY CONSERVING KILN METHOD AND APPARATUS

(76) Inventor: Steven B. Cress, P.O. Box 30, Glenbrook, NV (US) 89413

( * ) Notice: Subject to any disclaimer, the term of this patent is extended or adjusted under 35 U.S.C. 154(b) by 87 days.

(21) Appl. No.: 10/377,565

(22) Filed: Feb. 26, 2003

(51) Int. Cl.[7] .............................. F27B 1/12; F27B 5/08; F27D 1/00; F27D 1/12
(52) U.S. Cl. ....................... 219/398; 219/390; 219/405; 219/408; 432/120; 432/258
(58) Field of Search ................................ 219/390, 391, 219/392, 398, 405–408, 411; 373/137; 432/120, 152, 258

(56) References Cited

U.S. PATENT DOCUMENTS

| 4,208,573 A | * | 6/1980 | Risse ........................ 219/411 |
| 4,215,265 A | * | 7/1980 | White ........................ 219/390 |
| 4,572,427 A | * | 2/1986 | Selfridge et al. ............ 219/407 |
| 4,692,593 A | * | 9/1987 | Chiu .......................... 219/399 |
| 5,498,852 A | * | 3/1996 | Cress ......................... 219/390 |
| 6,031,207 A | * | 2/2000 | Dover et al. ................ 219/405 |
| 6,168,426 B1 | * | 1/2001 | Yamada ..................... 432/152 |
| 2004/0115583 A1 | * | 6/2004 | Hohenshelt et al. ........ 432/120 |

FOREIGN PATENT DOCUMENTS

JP        11029352 A    *  2/1999

* cited by examiner

Primary Examiner—J. Pelham  
(74) Attorney, Agent, or Firm—Herbert C. Schulze

(57) ABSTRACT

This is an electrically heated ceramic kiln and a method for varying the size of the kiln chamber by moveable top and/or bottom walls which can be moved vertically within the kiln chamber, together with a new method of insulating the kiln and providing captive air chambers about the kiln.

3 Claims, 3 Drawing Sheets

ELECTRICAL ENERGY CONSERVING KILN METHOD AND APPARATUS

BACKGROUND OF THE INVENTION

I. Field of the Invention

This invention is in the general field of electrically heated ceramic kilns;

The invention is more particularly directed to a method and apparatus for effective firing of different size kiln loads within a single kiln, in which adjustments of kiln size and electrical element use maximizes the effective use of electrical energy. Additionally a system for enhanced performance is provided with a unique captive air system.

II. Description of the Prior Art

A major problem in the firing of ceramic articles has been the problem of firing small loads of product in larger kilns. Many kiln users wish to use a large kiln for efficient firing. However, the problem is that a kiln cannot be operated efficiently and properly with less than a full load. Therefore, many kiln users either must delay firing smaller loads until a full load can be accumulated or must have a variety of kiln sizes.

In the past there have been limited attempts to manufacture and use kilns with a removable ring or the like to attempt to cause an effect somewhat approaching the simulation of a smaller kiln size within a larger kiln. Such efforts have never been fully successful as the nature of electrically heated kilns is such that varying power requirements are required in upper, middle, and lower segments of a kiln and at different stages of the firing cycles.

I am familiar with ceramic kilns and with firing and power requirements. I have, also, reviewed Patent Libraries, and the like. I have been unable to find any effective prior art.

As a result I have studied the problem thoroughly and have now conceived and developed a new, unique, novel, and useful method and the necessary apparatus to enable the successful firing of varying size loads within a single kiln efficiently.

Based upon my investigation and work, in this field I have concluded that there is no prior art which reveals, suggests, nor anticipates my present invention.

SUMMARY OF THE INVENTION

I have studied the structure of electrically fired kilns and the like and the requirements for proper heating of various zones within a kiln. I have discovered that by a proper utilization of a moveable kiln ceiling and/or floor and adjustable electrical elements and settings that I am able to create appropriately controlled and sized kiln conditions to allow a single large kiln to properly fire virtually any size load with proper and efficient use of electrical energy.

Additionally, I have conceived and developed a method and apparatus for providing further energy conservation by utilizing heat which would otherwise be lost in a proper manner by providing trapped or captive air pockets at various kiln locations.

It is an object of this invention to provide a method and apparatus for proper adjustment of the size of firing zones within an electric kiln in order to accommodate different size loads for different firing schedules;

Another object of this invention is to reduce the electrical energy required for vitrification of ceramic articles;

Another object of this invention is to provide a kiln which is capable of use for vitrifying a wide range of different sizes of loads of ceramic products with minimum use of electrical energy;

Another object of this invention is to provide such a kiln wherein excess heat in the kiln is utilized in trapped air pockets adjacent the kiln surfaces.

The foregoing and other objects and advantages of this invention will be understood by those skilled in the art upon reading the description of a preferred embodiment, which follows, in conjunction with a review of the appended drawings.

DESCRIPTION OF A PREFERRED EMBODIMENT

Figure 1:
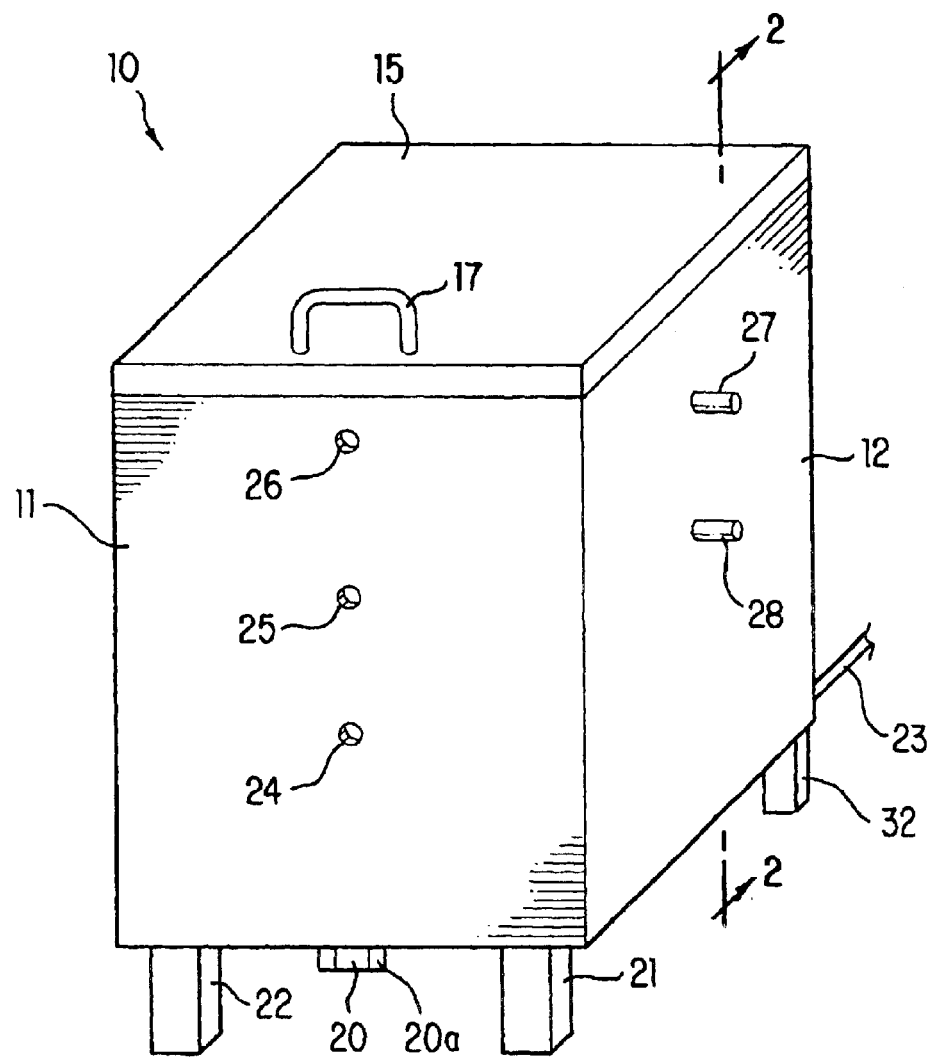
FIG. 1 is a schematic perspective of a ceramic kiln suitable to practice the methods of this invention.
Figure 2:
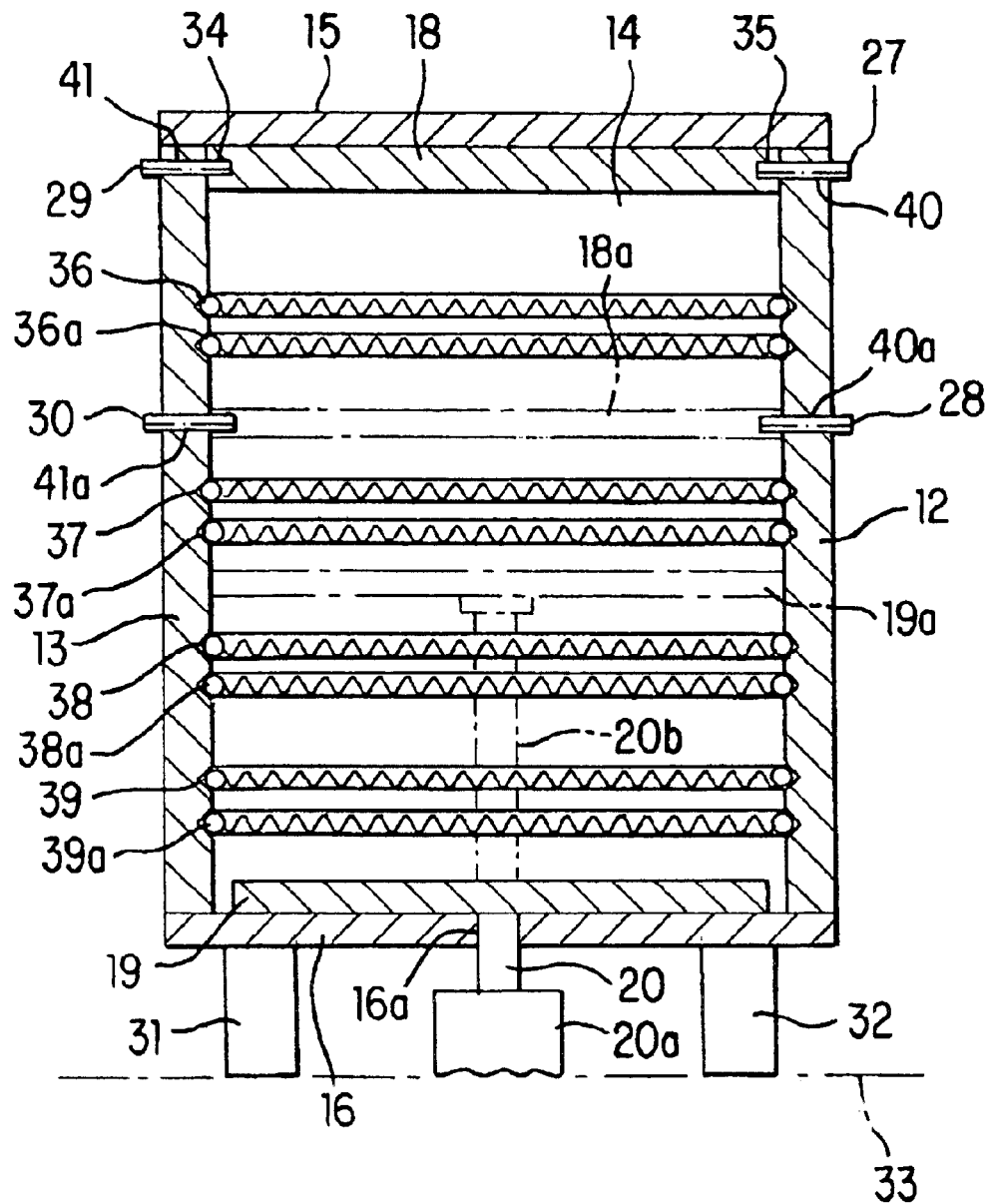
FIG. 2 is a schematic section on 2—2 on FIG. 1.

An inventory of items bearing reference numerals is:

Numeral Item Description
10 kiln
11 front wall
12 side wall
13 side wall
14 back wall
15 top
16 bottom wall
16a hole in bottom wall for ram
17 top handle
18 moveable top wall
18a alternate moveable top wall position
19 moveable bottom wall
19a alternate moveable bottom wall position
20 ram
20a hydraulic cylinder
20b alternate ram position
21 front leg
22 front leg
23 electric power source
24 peep hole
25 peep hole
26 peep hole
27 peg
28 peg
29 peg
30 peg
31 rear leg
32 rear leg
33 floor level
34 hole in edge of moveable wall
35 hole in the edge of moveable wall
36 electrical heating element
36a auxiliary heating element
37 electrical heating element
37a auxiliary heating element
38 electrical heating element
38a auxiliary heating element
39 electrical heating element
39a auxiliary heating element
40 hole in side wall
40a hole in side wall
41 hole in side wall 41a hole in side wall
50 base surface
51 support member
52 support member
53 dead air space
53a dead air space
54 support platform
55 support member
56 support member
57 kiln side wall
58 kiln floor
59 kiln top
60 kiln side wall
61 insulating block
61a insulating block
62 support member
63 support member
64 dead air space
65 insulating block
66 insulating block
67 support member
68 support member
69 metal case
70 heat reflector plate
71 heat reflector plate side
72 heat reflector plate side
73 heat reflector plate side
74 heat reflector plate side
75 heat reflector plate bottom
76 heat reflector chamber
77 trapped air chamber
78 trapped air chamber
79 trapped air chamber
80 trapped air chamber
81 trapped air chamber
82 trapped air chamber
83 trapped air chamber
84 trapped air chamber FIGS. 1 and 2 should be viewed together. A ceramic kiln generally 10 has a front wall 11, side walls 12 and 13, back wall 14, top 15 with handle 17, and bottom wall 16. The kiln may be supported above a floor or other surface 33 by legs 21, 22, 31, and 32. A customary electrical power source 23 will by supplied and will power the heating elements 36, 37, 38, and 39. Auxiliary heating elements 36a, 37a, 38a, and 39a may be provided to adjust kiln temperatures depending upon the size of the firing chamber as it is adjusted through movement of one or more moveable walls. Usually peep holes 24, and/or 25, and/or 26 will be provided for the kiln operator to observe conditions during firing.

All of these elements will be of relatively customary construction utilizing customary cases, fire brick and the like, all known to those skilled in the art.

A supplemental and moveable top wall 18 may be formed of a block of kaowool or other properly insulating material which will withstand the heat generated for ceramic vitrification and prevent the loss of heat from the firing chamber. This moveable top wall will be stored directly beneath the top wall 15 as shown in FIG. 2 and it can be held in position by a pair of pegs 27 and 29 inserted through holes 40 and 41 in the kiln sides and into holes 34 and 35 in edges of the moveable wall 18. It may then be moved to various positions such as shown at alternate moveable top wall position 18a where it is shown in phantom. In that position it can be held in place by pegs 28 and 30 through holes 40a and 41a in the side walls. In that position the effective kiln firing chamber will be reduced as will be understood by those skilled in the art.

The moveable bottom wall 19 rests against kiln bottom wall 16. It is shown connected to a ram or the like 20 which extends through a hole or the like 16a in the bottom wall. The ram may be actuated by hydraulic cylinder 20a or the like as will be understood by those skilled in the art. The ram may be actuated as shown in phantom 20b so as to raise the moveable bottom wall to higher positions, such as shown in phantom 19a. This action will reduce the size of the kiln firing chamber.

While either a top moveable wall or a bottom moveable wall will effectively reduce the chamber size, it may be desireable to use both a moveable top and a moveable bottom, thus uniformly shortening the height of the firing chamber.

The electrical heating elements 36, 37, 38, and 39 will be of customary construction for heretofore constructed kilns. However, there may be auxiliary heating elements 36a, 37a, 38a, and 39a in order that various zones in the various sized chambers may be properly heated. It is generally desirable to have higher heating at the vertical top and bottom of a kiln chamber than in the center as will be known to those skilled in the art. By providing the alternative heating elements it is possible to achieve this desireable condition when the the size of the chamber is changed.

Among the innovations of this invention are the discovery of a method and the means to implement it of a variable sized firing chamber within a larger chamber accompanied by the ability to alter the heating effect of the heating elements by connecting and disconnecting certain of the electrical elements and the resultant control of the temperatures at various locations within changing dimensions of the firing chamber. This can be done manually and visually with thermocouples and thermometers as is known to those skilled in the art. Also, those skilled in the art are familiar with methods and apparatus which can automatically adjust the use of various elements and supplemental elements.

Figure 3:
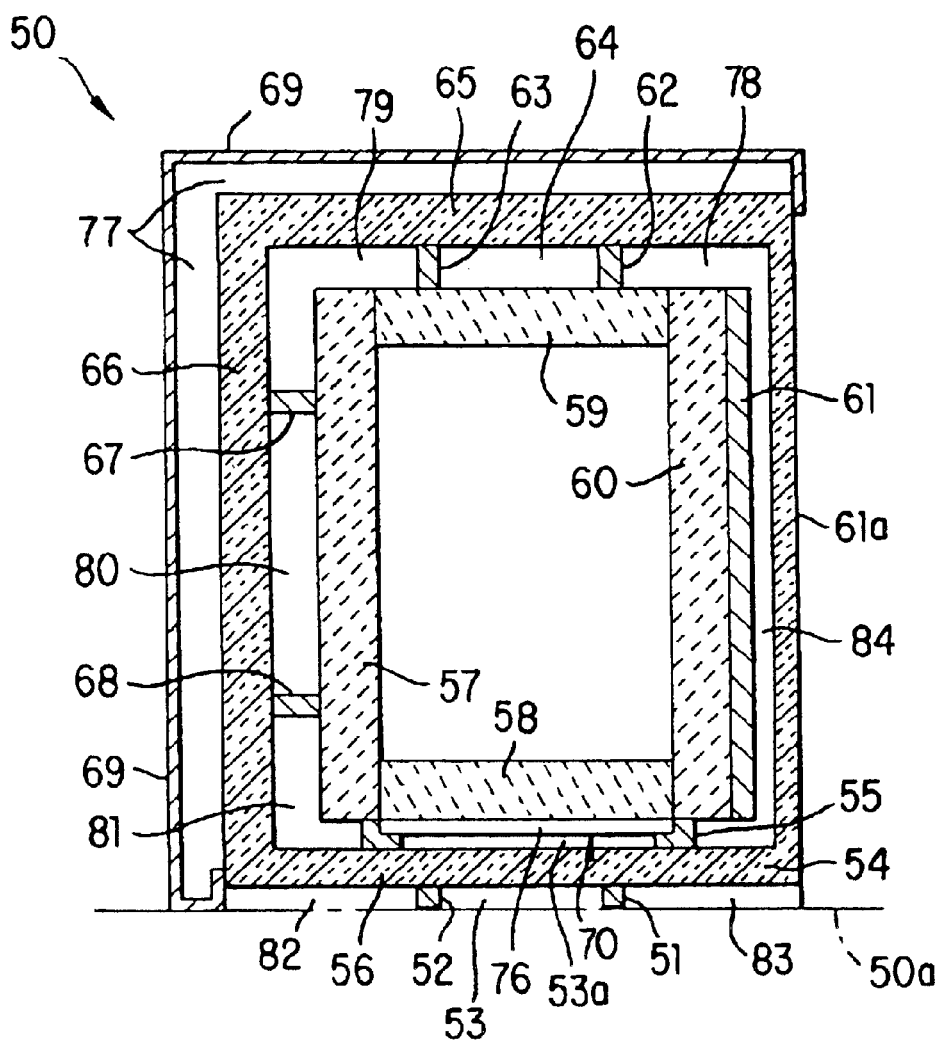
FIG. 3 is a schematic section on a kiln with the front and back walls removed suitable to practice at least one method of this invention.

FIG. 3 is a schematic section through a kiln with front and rear walls not shown and without a showing of the electrical heating elements and other customary features which will be understood by those skilled in the art. A kiln generally 50 is shown supported under its floor 58 by support members 55 and 56 resting on support platform 54 which is in turn supported by support members 51 and 52 which rest on base surface 50a. Dead air spaces 53 and 53a are created between the support members. The kiln will have customary side walls 57 and 60 and top and floor 59 and 58. An insulating block 61a may be supported by means known to those skilled in the art at a distance from insulating block 61. The insulating blocks may be formed of kaowool or the like. This will keep the block 61a from becoming hot enough to create a danger to anyone touching it. Insulating block 65 is supported on the kiln top 59 by support members 62 and 63. This creates dead air space 64. Insulating block 66 is attached to the side wall 57 by support members 67 and 68. A metal case 69 is mounted by means known to those skilled in the art exterior of the kiln.

Figure 3A:
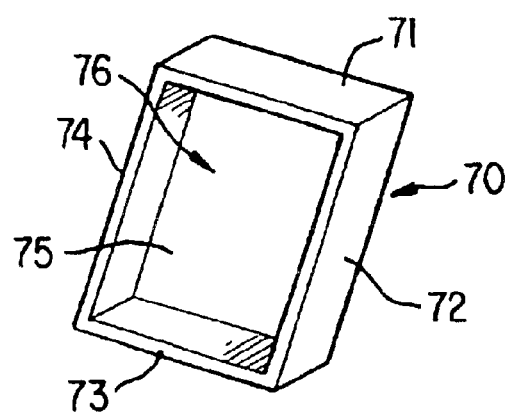
FIG. 3A is a perspective view of a heat reflector plate used in connection with the support frame work of a kiln to practice at least one method of this invention.

An important innovation is shown in FIG. 3A. I have discovered that I can provide for very efficient heat entrapment and transfer back into the kiln by forming what I call a heat reflector plate 70 and placing it adjacent the top of a kiln support frame or members. In the case shown in FIG. 3a I have illustrated a preferred heat reflective plate 70 comprising a bottom reflective plate 75 with four sides 71, 72, 73, and 74. I have found that the heat chamber 76 formed beneath the bottom of the kiln within the confines of the bottom of the kiln floor 58 and the four reflective plate walls 71, 72, 73, and 74 and the the reflective plate bottom 75 effectively increases the efficiency of the kiln in that the kiln is brought to proper firing temperature an as little as eighty percent (80%) of the time required without this reflective plate. It is also contemplated that similar heat reflective plates may be provided for all kiln fronts, backs, tops, and sides as will be understood by those skilled in the art. It is further enhanced by the additional trapped air chambers 77, 78, 79, 80, 81, 82, 83 and 84. Additionally similar trapped air chambers and heat reflective plates may be formed at the front and back of the kiln (which are purposely not shown and as will be understood by those skilled in the art.

Although not shown, it is to be understood that a moveable top and/or a moveable wall such as are shown in FIGS. 1 and 2 may be added to the kiln shown in FIG. 3.

Throughout the foregoing specification, and in the claims which follow, I may have used terms such as "elements", "pegs", "chamber", and the like. It is to be understood that commonly used equivalent words such as "filaments", "brackets", "enclosure" and like are are intended to be included in this teaching and invention.

By this reference I incorporate the claims and abstract which follow in this description of a preferred embodiment the same as though they were fully set forth here.

In the claims which follow, if I omit, or fail to claim, one of the inventive features disclosed or suggested in this application, such failure will be inadvertent and is not intended to be an indication that I have abandoned or dedicated such feature. If such should happen, it is my intent to cure the defect by reissue or other appropriate means when I discover any such omission or failure.

While the embodiments of this invention specifically shown and described are fully capable of achieving the objects, and advantages desired it is to be understood that such embodiments are for purposes of illustration only and not for purposes of limitation.

I claim:

1. A method of increasing efficiency and safety of ceramic kiln operations which includes the steps of mounting insulating blocks and a spaced metallic case about the kiln in such manner as to create captive or trapped air chambers about the top, bottom, front, back, and sides of the kiln.

2. The method of conserving electrical power in the operation of an electrically powered kiln comprising: mounting a heat reflective plate consisting of a heat reflective material in the form of a hollow polyhedron with one face open adjacent an outer kiln wall surface with the open face being in the geometric shape of, and facing the kiln wall.

3. The method of claim 2 wherein the reflective plate is within a trapped air chamber.

* * * * *